Aug. 11, 1931. F. E. BEACH 1,818,373
THEFT PREVENTING DEVICE
Filed May 25, 1928
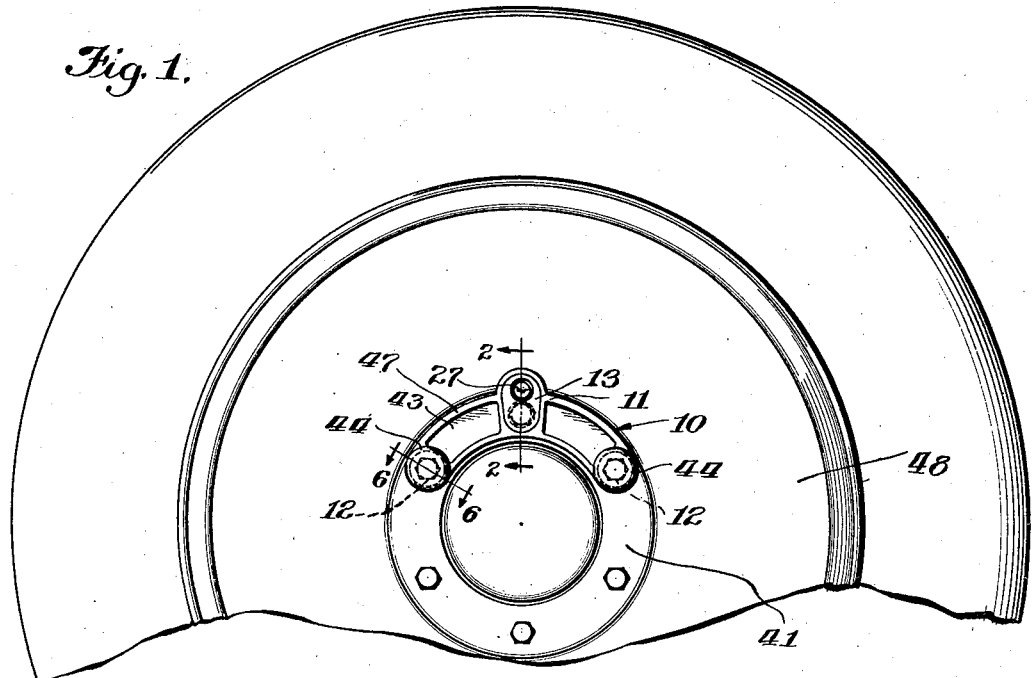
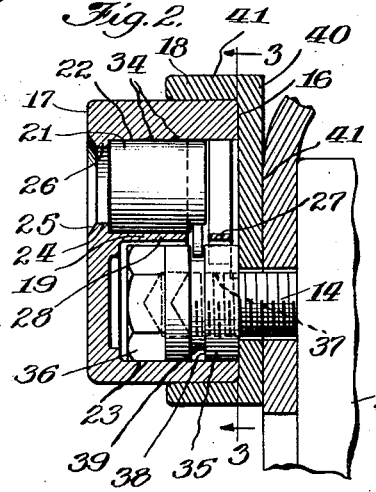
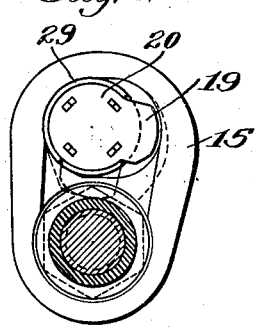
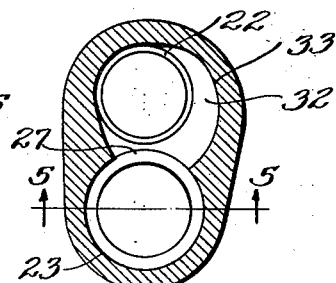
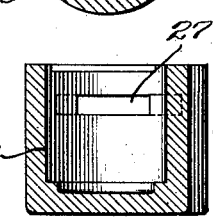
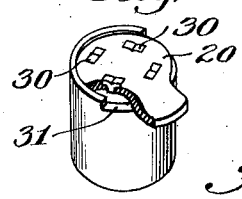
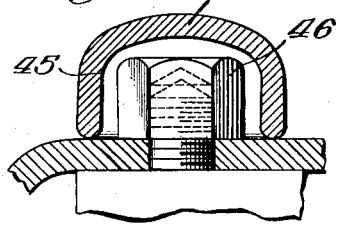
Inventor
Frederich E. Beach
By Williams, Bradbury,
McCaleb & Hinkle
Attys.

Patented Aug. 11, 1931

1,818,373

UNITED STATES PATENT OFFICE

FREDERICK E. BEACH, OF CHICAGO, ILLINOIS, ASSIGNOR TO PINES WINTERFRONT COMPANY, OF CHICAGO, ILLINOIS, A CORPORATION OF DELAWARE

THEFT PREVENTING DEVICE

Application filed May 25, 1928. Serial No. 280,423.

The present invention relates to theft preventing devices for spare wheels upon automotive vehicles.

Many of the spare wheel locks of the prior art include means for locking or preventing access to one of the nuts which secure the spare wheel to a carrier, the idea being that if one nut is locked, the wheel cannot be removed. It is possible, however, to frustrate the purpose of a spare wheel lock of the foregoing type by removing all of the other nuts, grasping the bottom of the wheel and lifting upward, thus using the wheel itself as a lever for breaking off the single stud bolt which carries a nut lock. Under such conditions, a tremendous bending and breaking force may be exerted on this single stud bolt so that it is practicaly impossible to prevent the theft of the spare wheels upon some types of automobiles by locking a single nut.

One of the objects of the present invention is the provision of a novel spare wheel lock including means for preventing access to a plurality of studs and nuts used to secure a spare wheel, said means being locked upon the carrier by a lock applied to one of the wheel supporting studs, thereby providing a plurality of spaced points of attachment for the spare wheel upon the carrier and preventing access to these points of attachment by a single locking device.

Another of the objects of the invention is the provision of a novel wheel lock structure including a nut covering member carried by one of the wheel supporting studs and locked thereon for preventing unauthorized access to several of the other wheel supporting studs, said member being recessed to receive and protect a casing member for preventing access to the first mentioned stud and locking the nut covering member on said stud.

Another object of the invention is the provision of a novel spare wheel lock including a nut and tumbler barrel enclosing member or nut lock which encloses all parts of the tumbler barrel except the key slot and which is itself slidably received in an auxiliary nut covering member so that the nut lock is reinforced and protected by the latter member to prevent insertion of prying devices between the nut lock and the wheel, and to prevent the breaking of the lock by hammering on the side of the nut lock.

Another object of the invention is the provision of a simplified and sturdy form of nut enclosing casing and lock which is more economically manufactured and assembled than the nut locks of the prior art.

Other objects and advantages of the invention will be apparent from the following description and from the accompanying drawings, in which similar characters of reference indicate similar parts throughout the several views.

Referring to the single sheet of drawings accompanying this specification;

Fig. 1 is an elevational view of a spare wheel and theft preventing device embodying my invention;

Fig. 2 is a cross sectional view taken on the line 2—2 of Fig. 1, looking in the direction of the arrows;

Fig. 3 is a rear elevational view of the nut lock taken on the line 3—3 of Fig. 2;

Fig. 4 is a cross sectional view of the nut lock casing with the tumbler barrel and nut removed, taken on the line 4—4 of Fig. 2;

Fig. 5 is a cross sectional view taken on the line 5—5 of Fig. 4;

Fig. 6 is a cross sectional view taken on the line 6—6 of Fig. 1;

Fig. 7 is a view in perspective of the tumbler barrel and locking plate partially broken away to show the mode of attachment of the locking plate.

Referring to Fig. 1, 10 indicates in its entirety my theft preventing device which consists of an auxiliary member 11 for enclosing or embracing one or more of the spaced securing nuts 12 which usually secure a spare wheel to the carrier. The theft preventing device 10 also includes a nut lock or locking device 13 which is adapted to be secured to one of the stud bolts 14 to secure both the auxiliary member 11 and to prevent access to the stud bolt 14, thereby locking both these devices by a common key-actuated locking device.

The nut lock 13 may comprise an oblong metal casing 15 preferably of substantially the same cross section from the bottom 16 to the outside 17, in order that it may be slidably received within a socket 18 formed in the auxiliary nut covering member 11.

The casing 15 is slightly widened at one end to provide walls of sufficient thickness and still permit room for the projecting portion 19 of a rotatably mounted locking plate 20 carried by a key-actuated tumbler barrel 21. The casing 15 is provided with a pair of bores 22 and 23 extending into the casing substantially parallel to each other, and the bore 22 is in communication with the outside 17 of the casing through a smaller bore 24 which may be slightly beveled as at 25 to facilitate the insertion of the key. The casing is thus provided with an annular inwardly projecting flange 26 which substantially encloses the end of the tumbler barrel 21 so that no part of the tumbler barrel is exposed, except sufficient of the key slot 27 to permit the insertion of a key, and the tumbler barrel is thereby more adequately protected against tampering than any of the devices of the prior art.

The bores 22 and 23 are in communication with each other by means of a slot 27 located at such a point in the partition 28 between the bores so that the locking plate 20 may be rotated to project through the slot 27. It will be evident that if desired, the partition 28 may be entirely removed between this point and the bottom of the casing for convenience in manufacture.

The key actuated tumbler barrel 21 comprises a cylindrical member of substantially conventional type having a key slot 27 and a cylindrical casing 29 for enclosing the tumblers and other working parts. The actuating member of the tumbler barrel is secured to the locking plate 20 by a plurality of lugs 30 projecting through said plate and riveted on the outside of the plate as shown in Fig. 7, and the wall of the cylindrical casing 29 may be cut away as at 31 to provide space for the projecting portion 19 of the locking plate, and to provide for a limited rotative movement of this portion of the locking plate.

The bore 22 is of sufficient size to receive the tumbler barrel 21 and near the bottom 15 of the casing, the bore 22 communicates with an enlarged recess 32 which has its exterior wall 33 formed on an arc which permits a clearance between this wall and the projecting portion 19 of the locking plate. The enlarged portion 32 is of sufficient depth to extend below the locking plate 19 and is in communication with the bore 23 through the slot 27. The tumbler barrel may be secured in the bore 22 by providing a plurality of teeth 34 in the outside of the tumbler barrel or by making the bore small enough so as to provide a very close frictional fit.

The bore 23 of the casing 15 is adapted to receive and enclose a threaded member or nut 35 having a non-circular portion 36 for engagement with a wrench or other tool and having a threaded aperture 37 adapted to receive one of the studs 14. The threaded member 35 is preferably formed with an annular shoulder 38 adapted to engage behind the portion 19 of the locking plate when the parts are in the position of Fig. 2, and this shoulder may be conveniently formed by providing an annular slot 39 of sufficient size and cross section to receive the locking plate.

The auxiliary nut covering member 11 comprises a metal member which may be formed by casting and which has a flat rear surface 40 adapted to lie against the flat annular surface 41 usually provided upon a spare wheel adjacent the securing nuts 12. The auxiliary member 11 also includes a socket 18 formed by an outwardly extending wall 42 of sufficient size to slidably receive the casing 15 of the nut lock, and the auxiliary member is also provided with a pair of laterally projecting arms 43 which carry at their ends the nut enclosing or embracing members 44.

The nut embracing members 44 comprise sockets 45 formed in the rear wall of the auxiliary member 11 and of sufficient size to receive the nuts 46 carried by the studs which are immediately adjacent the stud 14.

The arms 43 are preferably provided with reinforcing ribs 47 which extend from the nut enclosing sockets 45 to the lock receiving socket 18 along each side of the casing.

The mode of operation of my theft preventing device is as follows:

The wheel 48 is attached to its carrier in the usual manner by means of a plurality of nuts 12 on the studs 14 but project through the apertures in the wheel. One of the nuts 12 is removed and the auxiliary nut covering member 11 placed upon the stud 14 in engagement with the wheel 48. The nut 35 of my locking device is then substituted for the nut which has been removed, and the nut 35 is threaded on the stud 14 until it is in firm wedging engagement with the auxiliary member 11 clamping this member and the wheel to the carrier which is indicated diagrammatically at 49. The nut lock casing 15 is then inserted in the socket 18, the bore 23 receiving and enclosing the nut 35, and by turning the key in the slot 27, the portion 19 of the locking plate 30 is rotated into the slot 39 behind the shoulder 38.

The arms 43 with their sockets 45 then enclose and prevent access to a nut on each side of the stud 14, while access to the nut 35 is prevented by the casing 15 which securely locks both the casing and the auxiliary member 11 with the wheel upon the carrier.

As the wheel is secured in place at a plurality of spaced points of attachment to which access is prevented by my theft preventing device, it is practically impossible to pivot the entire wheel about a single securing bolt as in the devices of the prior art and the lock cannot be broken by using the wheel itself as a lever. Since the auxiliary member 11 lies flatly against the surface of the wheel, it is practically impossible to insert a prying tool between it and the wheel to gain access to the nuts 12 and it is likewise impossible to insert a prying tool below the nut lock casing 15 because of the outwardly projecting walls 41 of the socket 18 in which the casing 15 is received.

Furthermore, as the casing 15 is slidably received in its socket, it cannot be dislodged except by the application of an axial force and any hammering on the side of the casing 15 will only bind the casing within its socket and will bring no force to bear upon the relatively weak structure of the locking plate 20.

It will thus be observed that I have invented a novel theft preventing device in which the lock cannot be frustrated by removing all of the nuts except the one which is customarily locked, and my locking device includes an auxiliary nut covering member which may be made of sufficient strength to withstand any forces which may be exerted upon it, and which also is adapted to receive and protect a nut locking casing in such manner that breaking strains cannot be successfully exerted upon the nut lock.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a spare wheel theft preventing device, the combination of a carrier with a spare wheel, said carrier having a plurality of attaching studs for supporting said wheel, securing means carried by certain of said studs for securing said wheel, an arm carried by one of said studs, said arm having a depression for embracing one of said securing means, and a locking device carried by said latter stud for locking said wheel and arm on said carrier.

2. In a spare wheel theft preventing device, the combination of a carrier with a spare wheel, said carrier having a plurality of attaching studs for supporting said wheel, securing means carried by certain of said studs for securing said wheel, an arm carried by one of said studs, said arm having a depression for embracing one of said securing means, a threaded member for securing said arm on said stud, and an unauthorized access preventing casing for enclosing said threaded member.

3. In a spare wheel theft preventing device, the combination of a carrier with a spare wheel, said carrier having a plurality of attaching studs for supporting said wheel, securing means carried by certain of said studs for securing said wheel, an arm carried by one of said studs, said arm having a depression for embracing one of said securing means, a threaded member for securing said arm on said stud, and an unauthorized access preventing casing for enclosing said threaded member, said arm being provided with a socket for receiving said casing.

4. In a spare wheel theft preventing device, the combination of a carrier with a wheel, a plurality of studs on said carrier for supporting said wheel, securing nuts on some of said studs, an auxiliary member carried by one of said studs for embracing said nuts, said member having a pair of balanced arms, and a socket between said arms, and a locking device carried in said socket for securing said arm on a stud of said carrier.

5. In a spare wheel theft preventing device, the combination of a carrier with a wheel, a plurality of studs on said carrier for supporting said wheel, securing nuts on some of said studs, an auxiliary member carried by one of said studs for embracing said nuts, said member having a pair of balanced arms, and a socket between said arms, a nut carried by one of said studs in said socket, a casing slidably carried by said socket, and key actuated means for locking said casing on said nut.

6. In a spare wheel theft preventing device, the combination of a carrier with a wheel, a plurality of studs on said carrier for supporting said wheel, securing nuts on some of said studs, an auxiliary member carried by one of said studs for embracing said nuts, said member having a pair of balanced arms, and a socket between said arms, a nut carried by one of said studs in said socket, a casing slidably carried by said socket, said casing having a pair of bores and an opening from one of said bores through said casing, and a key actuated tumbler barrel, in one of said bores having its key slot disposed for access through said opening.

7. In a spare wheel theft preventing device, the combination of a carrier with a wheel, a plurality of studs on said carrier for supporting said wheel, securing nuts on some of said studs, an auxiliary member carried by one of said studs for embracing said nuts, said member having a pair of balanced arms, and a socket between said arms, a nut carried by one of said studs in said socket, a casing slidably carried by said socket, said casing having a pair of bores and an opening from one of said bores through said casing, a key actuated tumbler barrel, in one of said bores having its key slot disposed for access through said opening, and a plate carried by said barrel for rotation into a depression in said nut.

8. A spare wheel lock comprising an arcuate metal member provided at its ends with nut embracing recesses and provided midway of its ends with a nut receptacle and an opening through which a bolt may project into said receptacle for engagement by a nut located in said receptacle, and means for preventing unauthorized access to said receptacle.

9. A spare wheel lock consisting of a rigid arcuate member provided at the extremities of its reverse face with recesses each adapted to embrace and cover a nut, an aperture in said arcuate member adapted to receive a stud bolt, and means carried on the obverse face of said arcuate member adapted to prevent unauthorized access to a nut disposed on the stud bolt aforesaid.

10. A spare wheel lock comprising a rigid metal member provided at its central portion with a bolt aperture and also provided on its obverse face with means adapted to prevent unauthorized access to a nut disposed on a bolt extending through said aperture, said member being provided with a pair of curved arms each provided near the extremity of its obverse face with a nut covering recess.

11. A spare wheel lock comprising a rigid metal member provided at its extremities with nut embracing openings and at its central point with a bolt passing aperture, and means for locking said member on a bolt passing through said aperture, said nut embracing openings being adapted to embrace nuts carried on bolts disposed in the arc of a circle with a bolt passing through the aperture aforesaid.

In witness whereof, I hereunto subscribe my name this 23rd day of May, 1928.

FREDERICK E. BEACH.